United States Patent Office.

WILLIS C. HALL AND COLATRES MOORE, OF CALIFORNIA, MISSOURI.

Letters Patent No. 93,300, dated August 3, 1869.

---

IMPROVED EYE-SIRUP.

---

The Schedule referred to in these Letters Patent and making part of the same.

---

*To all whom it may concern:*

Be it known that we, WILLIS C. HALL, and COLATRES MOORE, of California, in the county of Moniteau, and State of Missouri, have made a certain new and useful medicinal compound, which, from its use and nature we designate an Eye-Sirup; and we do hereby declare the following to be a full and true description thereof, in its ingredients, and method of compounding, and application.

The said sirup is to be used for diseased eyes, more especially, although the same may be used to allay inflammation in other delicate tissues of the body. The same is formed out of the principal ingredients in the manner now more fully to be described.

We take of pulverized white sugar, by weight, seventy (70) parts; of sulphate of zinc, powdered, by weight, thirty-five (35) parts; and of, by preference, red aniline, but which may be aniline of other colors, by weight, one (1) part, and dissolve the same in as many parts of clear soft water as will give a solution without sediment.

There may be a slight departure from the proportions thus given, and especially in aggravated cases of chronic eye diseases the quantity of the last-named ingredient may be increased to strengthen the medicinal effect of said ingredient.

The sirup, thus formed, is a clear reddish liquid, and it is applied by mixing, say, three (3) drops thereof with five (5) drops of clear, usually soft water, the eyelids and corners being thoroughly bathed therewith, say three (3) times a day, after meals. This is continued until inflammation or ulceration ceases, whereupon the sirup is applied in similar quantities and manner under the eyelids until a cure is effected.

The eyes are not to be washed but once during the day, and then with warm water before applying the sirup.

In all cases of application, the eyes should not be rubbed or irritated, and the sirup be permitted to dry thereon.

When the eyes are merely weak or sore, without chronic inflammation, two (2) drops of the sirup will be used with six (6) to eight (8) drops of clear water, in the general manner before described.

We do not limit ourselves to the exclusive use of the two ingredients first mentioned; we are aware that there are sundry chemically-equivalent compounds and ingredients that may replace them in our said eye-sirup; and having thus fully described our invention,

What we claim, is—

1. The use of aniline compounds, substantially as and for the purpose set forth.

2. The use of the several ingredients, substantially as and for the purposes set forth.

In testimony whereof, we have hereunto set our hands in the presence of—

WILLIS C. HALL.
    C. MOORE.

Witnesses:
 JNO. M. WILLIAMS,
 JAMES JORDAN.